United States Patent
Steiner et al.

(10) Patent No.: US 12,092,212 B2
(45) Date of Patent: Sep. 17, 2024

(54) PARKING BRAKE ASSEMBLY WITH EMERGENCY ACTUATOR WITH PASSIVE ACCELERATION COMPENSATION, AND METHOD FOR PREVENTING UNDESIRED TRIGGERING OF THE EMERGENCY ACTUATOR

(71) Applicant: MAGNA Powertrain GmbH & Co KG, Lannach (AT)

(72) Inventors: Bernhard Steiner, Viehdorf (AT); Andras Kristofcsak, Leverkusen (DE)

(73) Assignee: MAGNA Powertrain GmbH & Co KG, Lannach (AT)

( * ) Notice: Subject to any disclaimer, the term of this patent is extended or adjusted under 35 U.S.C. 154(b) by 0 days.

(21) Appl. No.: 18/142,623

(22) Filed: May 3, 2023

(65) Prior Publication Data
US 2023/0366464 A1 Nov. 16, 2023

(30) Foreign Application Priority Data
May 13, 2022 (DE) ...................... 10 2022 204 691.9

(51) Int. Cl.
*F16H 63/34* (2006.01)
(52) U.S. Cl.
CPC ..... *F16H 63/3491* (2013.01); *F16H 63/3425* (2013.01); *F16H 63/3466* (2013.01)

(58) Field of Classification Search
CPC ............. F16H 63/3491; F16H 63/3425; F16H 63/3466
See application file for complete search history.

(56) References Cited

U.S. PATENT DOCUMENTS

| 11,168,754 B2 | 11/2021 | Sayama | |
| 2007/0125608 A1* | 6/2007 | Tarasinski | ........... F16H 63/3416 |
| | | | 188/161 |
| 2009/0321215 A1* | 12/2009 | Giefer | ..................... B60T 1/005 |
| | | | 192/219.5 |
| 2023/0349463 A1* | 11/2023 | Hasenkamp | ........ F16H 63/3416 |

FOREIGN PATENT DOCUMENTS

| CN | 110686078 A | * | 1/2020 | |
| CN | 112212004 A | | 1/2021 | |
| DE | 102012011424 A1 | * | 12/2013 | ......... F16H 63/3433 |
| DE | 102012012673 A1 | | 12/2013 | |
| EP | 1679456 A1 | | 7/2006 | |
| EP | 3067591 A1 | | 9/2016 | |
| WO | 2021121484 A1 | | 6/2021 | |

* cited by examiner

*Primary Examiner* — Lori Wu
(74) *Attorney, Agent, or Firm* — Dickinson Wright PLLC

(57) ABSTRACT

Parking brake assembly for a transmission in a vehicle with an electric actuation of the parking brake via a mechanism and with an emergency actuator with a lift magnet on a spring accumulator for application of the parking brake. The spring accumulator has a pawl rotatable about a pivot point connected to the lift magnet and a mass element connected to the pawl and rotatable about a second pivot point.

4 Claims, 3 Drawing Sheets

PARKING BRAKE ASSEMBLY WITH EMERGENCY ACTUATOR WITH PASSIVE ACCELERATION COMPENSATION, AND METHOD FOR PREVENTING UNDESIRED TRIGGERING OF THE EMERGENCY ACTUATOR

CROSS-REFERENCE TO RELATED APPLICATIONS

This application claims priority to German Patent Application No. 10 2022 204 691.9 filed on May 13, 2022. The entire disclosure of the above application is incorporated herein by reference.

FIELD OF THE INVENTION

The invention concerns a parking brake assembly for a transmission in a vehicle with an electric actuation of the parking brake via a mechanism, and with an emergency actuator with lift magnet on a spring accumulator for applying the parking brake.

The invention also concerns a method for preventing undesired triggering by accelerations on the movable armature of the lift magnet of the parking brake assembly.

BACKGROUND OF THE INVENTION

This section provides information related to the present disclosure which is not necessarily prior art.

DE 10 2012 012 673 A1 describes a motor vehicle drive train device with a transmission having at least one transmission shaft and a transmission casing, with a parking brake which is provided for a form-fit locking of a motor vehicle drive train and has a parking brake cog arranged rotationally fixedly on the transmission shaft, and a locking element connected to the transmission housing and intended for form-fit engagement in the parking brake cog, and with a shift roller actuator having a shift roller for actuating the parking brake and the transmission.

WO 2021 121 484 A1 concerns a parking brake for a motor vehicle with a pawl for reversible engagement in the parking brake cog, with a spring-preloaded actuating element for inserting the pawl in the parking brake cog, with an actuator for moving the actuating element and with the coupling element between the actuator and the actuating element.

An electromechanical parking brake has a blocking element for reversible engagement in a parking brake cog, an actuating element which can be pretensioned by an actuating spring for inserting the blocking element in the parking brake cog, an electric motor with a control unit for moving the actuating element out of the blocked position against the spring force of the actuating spring into an unblocked position, and a lift magnet which holds the actuating element in the unblocked position via a securing element. The parking brake has an emergency locking position in which the parking brake is unlocked and in which the blocking element can be moved by the electric motor even in the case of loss of function of the lift magnet and hence without its action. By the movement of the securing element from its securing position, the pretension of the actuating element can be released so that this moves into the blocking position and thereby lock the parking brake. Both the lift magnet and the switching motor may constitute primary and/or secondary application paths.

On use of the vehicle under extreme conditions, acceleration peaks act on all components of the vehicle. For safety reasons therefore, many vehicle manufacturers require full function of the parking brake up to 100 G in different spatial directions. Full function here means that the parking brake cannot engage accidentally. Undesired triggering of the lift magnet leads to release of the emergency lock and hence to application of the parking brake. If this occurs during travel, an unwanted rattling of the pawl on the parking brake cog occurs and hence unwanted noise development. If the parking brake is applied below the permitted application speed, the vehicle comes to a standstill.

The object here is to prevent undesired triggering of the lift magnet due to impacts or vibrations during travel, in particular off-road travel.

SUMMARY OF THE INVENTION

This section provides a general summary of the disclosure, and is not a comprehensive disclosure of its full scope or all of its features.

The object is achieved with a parking brake assembly for a transmission in a vehicle with an electric actuation of the parking brake via a mechanism and with emergency actuation with a lift magnet on a spring accumulator for application of the parking brake, wherein the spring accumulator has a pawl rotatable about a pivot point connected to the lift magnet and a mass element connected to the pawl and rotatable about a second pivot point.

It is advantageous that the spring accumulator can be triggered via the pawl with a first rotary movement, wherein a compensation rotary movement occurs in a second rotary movement via the mass element with an inert mass.

The mass element counters an undesired vehicle-induced acceleration of an armature of the lift magnet.

Here, the mass element engages with a ball engagement in the pawl and executes a rotary movement about a rotary element hinged onto the housing of the spring accumulator.

The mass element is balanced such that the inertial forces on the mass element generate only a rotary movement about a desired axis. This inertial moment is matched to the mass inertia of the armature to be compensated.

The object is furthermore achieved with a method for compensating for acceleration peaks in a parking brake assembly, wherein acceleration peaks occur in the direction of actuation of an emergency actuator assembly with lift magnets and spring accumulator, and the thereby triggered movement of the armature of a lift magnet is compensated by an opposing movement at the spring accumulator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DESCRIPTION OF THE INVENTION

Figure 1:
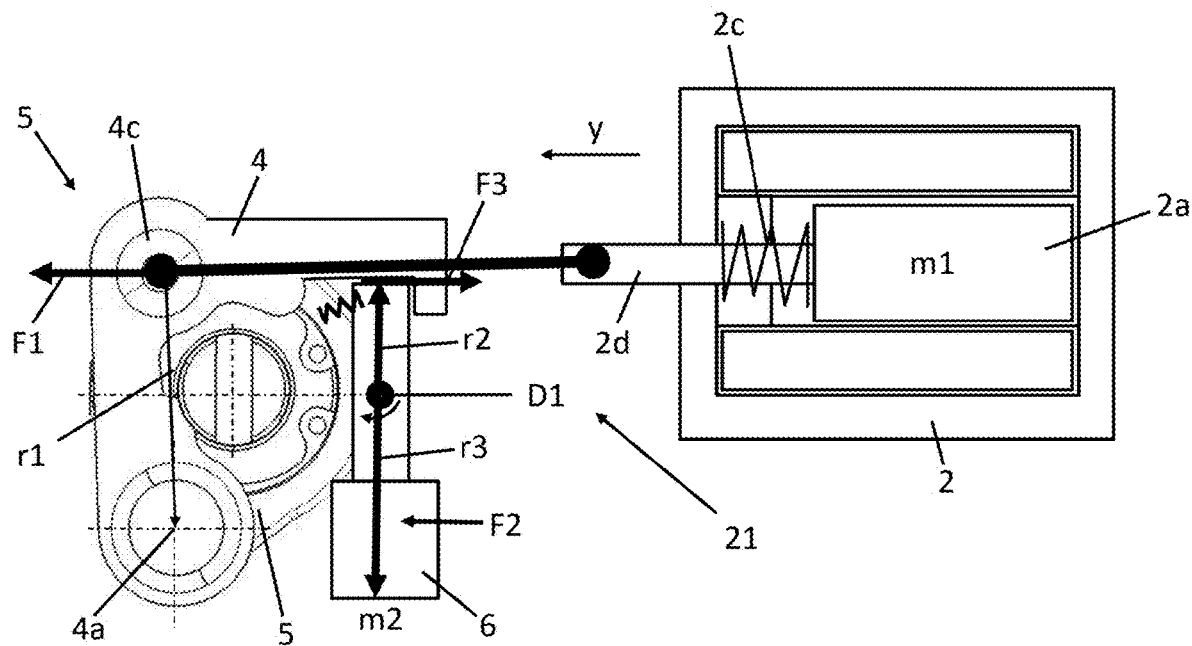
FIG. 1 shows schematically the function principle of the invention.

The parking brake assembly 1, in addition to regular actuation assembly of the parking brake with a locking pawl 3 and an electric motor (not shown in FIG. 2), contains an emergency actuator assembly 21 which allows independent triggering of the locking pawl 3. If the electric motor does not trigger the locking pawl despite the vehicle and/or the driver wishing to trigger this function, a lift magnet 2 is used. This function is a redundant safety function.

The parking brake is normally actuated in the known fashion via a toothed element 7 which is connected to the parking brake actuation. A lever system 20 is indicated in the parking brake assembly 1 and serves to apply the locking pawl 3 by rotation of the locking pawl 3 about the axis 3*b*. The pawl tooth 3*a* engages in a parking brake cog of a transmission of the vehicle and fixedly secures it.

Figure 2:
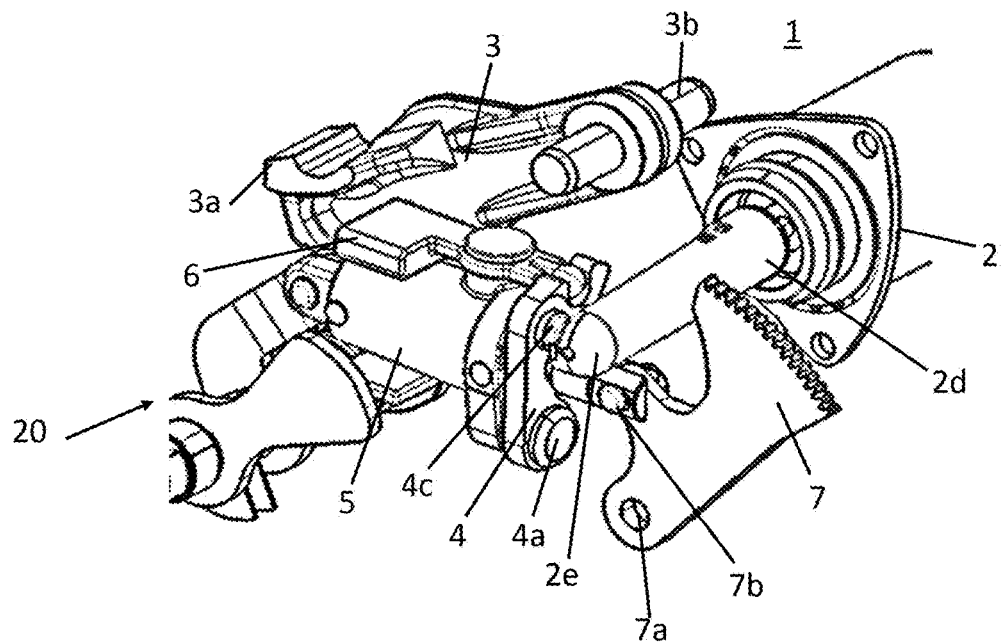
FIG. 2 shows an extract of a parking brake system with emergency actuator assembly.
Figure 3:
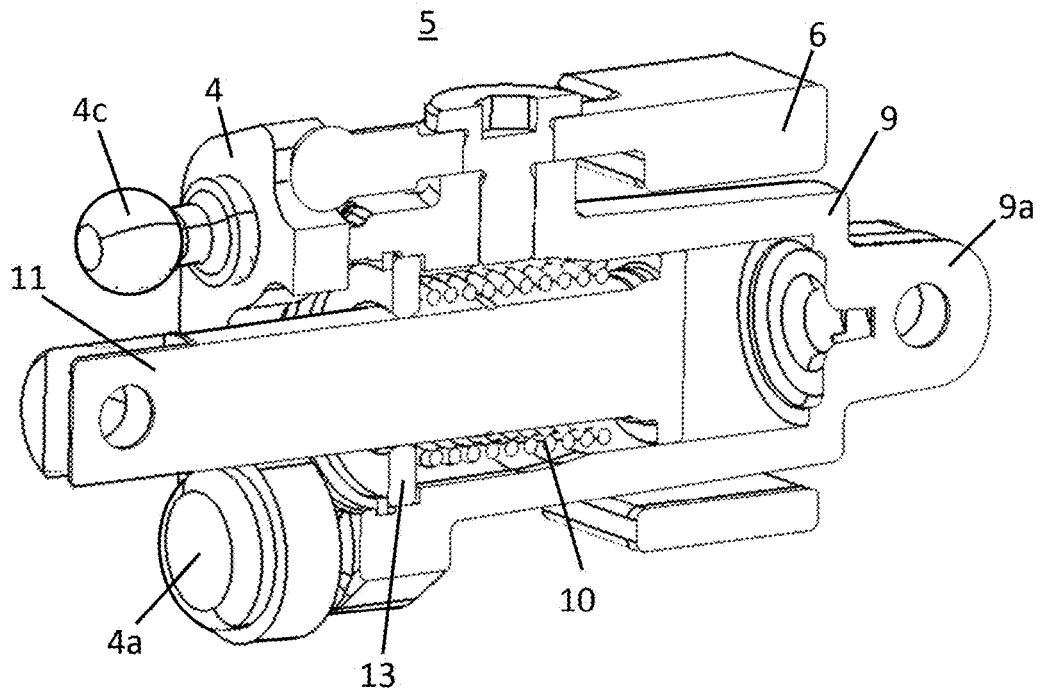
FIG. 3 shows a section through the emergency actuator.
Figure 4:
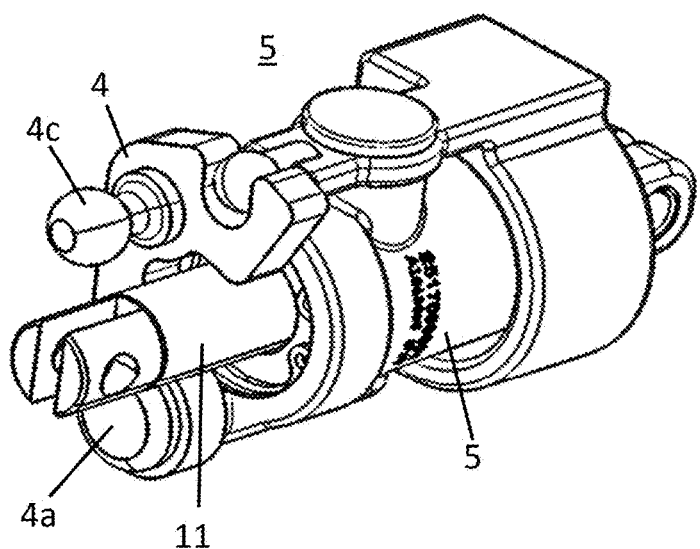
FIG. 4 shows a view of the emergency actuator.
Figure 5:
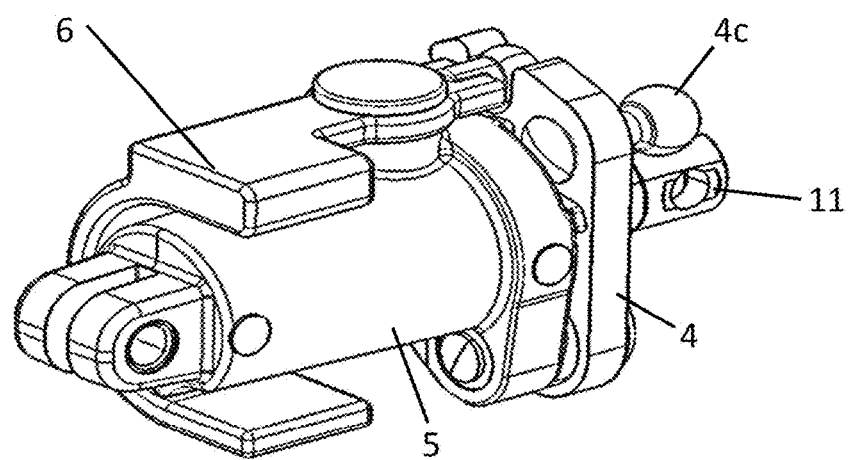
FIG. 5 shows a further view.

The toothed element 7 furthermore serves to pretension a spring accumulator 5. It is shown in FIG. 2 that the toothed element 7 is connected to a piston rod 11 via a joint 7*b*, and secured via a hinge point 7*a* on the housing. A movement of the toothed element 7 about the hinge point 7*a* shifts the piston rod 11 linearly in a housing 9 of the spring accumulator 5. Thus after application of the parking brake, a spring 10 of the spring accumulator 5 is pretensioned.

Emergency actuation takes place via the lift magnet 2. The armature 2*a* of the switch magnet 2 is connected via a coupling rod 2*d* to the locking pawl 4 of the spring accumulator 5, and when the lift magnet is energised, can rotate this about its rotational axis 4*a*.

The coupling rod 2*d* has a ball head 2*e* which acts on a ball 4*c* of a locking pawl 4. The pawl 4 is arranged on the end face of the housing 9 of the spring accumulator 5. The housing 9 of the spring accumulator 5 contains a cylindrical space in which the spring 10 presses the piston rod 11 against a locking disc 13. The housing 9 ends in a connection 9*a* for a lever.

The locking pawl 4 is arranged on the housing 9 so as to be rotatable about a pivot point 4*a*. Emergency actuation occurs when the lift magnet 2 is energised and the armature 2*a*, via the coupling rod 2*d*, twists the locking pawl 4 about the pivot point 4*a* out of a locking groove of the piston rod 11, and thereby releases the piston rod. The spring 10 running inside the housing 9 can shift the piston rod 11 relative to the housing 9, actuating the lever gear 20.

To prevent the vehicle, under extreme acceleration, from moving the armature 2*a* of the lift magnet 2 in the armature longitudinal direction, i.e. the direction of the regular emergency actuation, and thus undesirably releasing the spring accumulator 5, a mass element 6 is fitted which compensates for the inertial forces of the armature 2*a*.

In FIG. 1, the masses and accelerations are depicted schematically. The accidentally accelerated mass $m1$ of the armature is moved in the armature longitudinal direction, which is to be prevented. The acceleration force on the ball 4*c* of the pawl 4 is $F1=m1*a$. The mass element 6 is rotatably mounted at a pivot point D1. The mass element 6 has a mass $m2$, wherein the main mass extends at a lower end of the mass element. The pivot point D1 is not situated centrally in the longitudinal extent of the mass element 6, so a radius $r2$ exists from the pivot point to the point of engagement on the pawl 4. A radius $r3$ exists from the pivot point D1 to the centre of gravity of the mass $m2$. To compensate for the acceleration force F1 at the ball 4*c*, an acceleration force F3 must be present. This acceleration force F3 consists of the acceleration force F2, which is defined by the inert mass $m2*a$ and translated by the lever arm ratios. F3 thus amounts to $m2*a*(r3/r2)$.

This prevents the twisting of the pawl 4 and the spring accumulator is not triggered.

For regular triggering, the pawl 4 is rotated about the pivot point 4*a* and hence the piston rod 11 is released. The spring 10 can relax and moves the piston rod 11 into the housing. Thus when the toothed element 7 is stationary, the lever gear 20 is moved and the parking brake engaged.

What is claimed is:

1. A parking brake assembly for a transmission in a vehicle comprising an electric actuator configured for an electric actuation of the parking brake via a mechanism and with an emergency actuator allowing actuation with a lift magnet and a releasable spring accumulator for application of the parking brake, wherein the spring accumulator has a pawl rotatable about a pivot point connected to the lift magnet and a mass element connected to the pawl and rotatable about a second pivot point.

2. The parking brake assembly according to claim 1, wherein the spring accumulator can be triggered via the pawl with a first rotary movement, wherein the twist of the pawl causes a second rotary movement of the mass element with an inert mass.

3. The parking brake assembly according to claim 1, wherein the mass element counters a vehicle-induced acceleration of an armature of the lift magnet.

4. The parking brake assembly according to claim 1, wherein the mass element engages with a ball engagement in the pawl and executes a rotary movement about a rotary element hinged onto the housing of the spring accumulator.

* * * * *